(12) United States Patent
Kim

(10) Patent No.: US 7,807,734 B2
(45) Date of Patent: Oct. 5, 2010

(54) LOW FRICTION TYPE ANTI-FOULING PAINT

(76) Inventor: Dong Kyu Kim, The # Senteom Park Apt. 114-1202, 1200 Jaesong-Dong, Haeundae-Gu, Busan (KR)

(*) Notice: Subject to any disclaimer, the term of this patent is extended or adjusted under 35 U.S.C. 154(b) by 776 days.

(21) Appl. No.: 11/640,746

(22) Filed: Dec. 18, 2006

(65) Prior Publication Data

US 2008/0021132 A1    Jan. 24, 2008

(30) Foreign Application Priority Data

Jul. 22, 2006    (KR) .................. 10-2006-0068789

(51) Int. Cl.
  *C09D 5/16*    (2006.01)
  *C08K 5/29*    (2006.01)
  *C08G 59/50*   (2006.01)

(52) U.S. Cl. .................. 523/177; 523/122; 524/196; 524/243; 524/252; 524/255

(58) Field of Classification Search .................. 523/122, 523/177; 524/196, 243, 252, 255
  See application file for complete search history.

(56) References Cited

U.S. PATENT DOCUMENTS

2002/0123562 A1* 9/2002 Stender et al. .............. 524/589

* cited by examiner

*Primary Examiner*—Kriellion A Sanders
(74) *Attorney, Agent, or Firm*—Park & Associates IP Law LLC

(57) ABSTRACT

Provided is a low friction type anti-fouling paint. The antifouling paint includes prepolymer fluid formed of 10% to 30% NCO mythylene diisocyanate of 100 wt %; and resin fluid formed of polyoxylpropylenediamine of about 42 wt % to 48 wt % for adjusting an elongation and a tensile strength of a paint film, polyethertriamine of about 8 wt % to 10 wt % having a molecular weight of 5,000 for adjusting a curing time, polydiphenyltriamine of about 15 wt % to 20 wt % for adjusting a curing physical property and increasing the elongation, a modified silicone fluid of about 8 wt % to 12 wt % for increasing a slip and an anti fouling property, a filler of about 5 wt % to 9 wt % for increasing an abrasion resistance, an adhesion promoter of about 1 wt % to 2 wt %, and a pigment of about 1 wt % to 2 wt %.

1 Claim, No Drawings

LOW FRICTION TYPE ANTI-FOULING PAINT

BACKGROUND OF THE INVENTION

1. Field of the Invention

The present invention relates to paint (Hereinafter, referred to as "anti-fouling paint") coated on inner surfaces (Hereinafter, referred to as "surface") of a ship hull, fluid and gas transfer pipes, a steel pipe for water service, and a concrete water tank, and preventing a foreign material from adhering to the surface, and more particularly, to a low friction type anti-fouling paint in which it is composed of low friction type silicone-based polyurea formed of prepolymer fluid and resin fluid, thereby making a surface smooth and remarkably reducing a friction resistance between fluid and the surface and thus, a surface tension is reduced and a surface fluidity is improved, thereby, in application to a ship, giving a contribution to fuel economy and at the same time, fundamentally preventing the adherence of a foreign material, and the respective prepolymer fluid and resin fluid are sprayed by a two-liquid spray equipment and at the same time, are mixed without a mixing process and are cured at a high speed within one to two minutes, thereby making it possible to form a strong and thick paint film and thus, providing excellent elongation, elasticity, abrasion resistance, anti fouling property, durability, and adhesion force, and providing environment-friendliness not causing environmental pollution.

2. Description of the Related Art

In general, an anti-fouling paint for a ship for protecting a ship hull from a marine life has been changed and developed in several forms. In particular, various kinds of marine lives adhere to part of the hull submerged under water of the sea. This marine life affects a hull resistance and thus, serves as a factor of not only increasing an amount of fuel consumption but also reducing a sailing speed. Thus, in order to suppress adherence of the marine life under water, all shipping, engine maker, shipyard, paint industries are making endless endeavor. In recent years, due to large sizing and high speed of a ship, the amount of fuel consumption is increasing by geometric progression.

In order to prevent the marine life from adhering to a bottom part submerged under water of the sea as above, a conventional anti-fouling paint of a type where a tin compound is added has popularly been used. Such paint is cheap in price, is easy in treatment, and is excellent in anti fouling performance and thus, the marine life is less adhered to all the ships at anchor or in sailing.

However, the tin compound is known to discharge environmental hormone in view of its property and thus be a main factor of ocean pollution. In order to complement it, a recent newly developed and used type is a self polishing anti-fouling paint showing an anti fouling performance without the tin compound, using a principle in which a film of the anti-fouling paint is polished little by little while the ship sails. However, the self polishing anti-fouling paint has a drawback that the paint film is very weak in strength and thus has to be frequently painted for repair, and since the paint film itself has no great anti fouling performance, the marine life adheres to the ship by a large amount in case where the ship is anchored for a long time.

As the self polishing anti-fouling paint, there are known an anti-fouling paint having a self polishing binder having half-ester or half-amide as a vehicle at a side chain terminal of polymer, and including a metal containing anti-fouling agent as disclosed in Korean Patent Laid Open No. 1999-61474 published on Jul. 26, 1999, and an anti-fouling paint composed of vinyl polymer having a plurality of Schiff base typed primary amino groups as vehicle resins within a molecule as disclosed in Korean Patent No. 254651 patented on Feb. 3, 2000.

However, the anti-fouling paints disclosed in the Korean Patent Laid-Open No. 1999-61474 and the Korean Patent No. 254651 have drawbacks that, since an anti-fouling component is reacted with and eluted in seawater, a paint film reduces in durability and thus, repair painting should be frequently performed, and when the ship is anchored for a long time, the elution of the anti-fouling component is not activated and thus, the marine life adheres to the ship by a large amount.

The marine life in the seawater adheres to and lives even on inner surfaces of a wall of a farm breeding a marine fish and made of concrete or a pipe for pumping up seawater. Thus, frequent washing or replacement is performed, thereby becoming a factor of increasing many workforces and costs.

In addition, there is a drawback that a foreign material included in fluid adheres to inner surfaces of a variety of pipes for transporting the fluid, such as a water supply pipe and a drainage pipe, thereby not only causing a non-smooth flow of the fluid but also causing a corrosion of the pipe by the foreign material and shortening a lifetime.

SUMMARY OF THE INVENTION

Accordingly, the present invention is directed to a low friction type anti-fouling paint that substantially overcomes one or more of the limitations and disadvantages of the conventional art.

One object of the present invention is to provide a low friction type anti-fouling paint in which prepolymer fluid formed of main material of 10% to 13% NCO (N=C=O bonding) methylene diisocyanate, and resin fluid formed of polyoxylpropylenediamine, polyethertriamine having a molecular weight of 5,000, polydiphenyltriamine, modified silicone fluids, modified fluorinated resin, filler, adhesion promoter, and pigment are provided respectively, and the respective prepolymer fluid and resin fluid are sprayed by a two-liquid spray equipment, thereby forming a high-speed curing polyurea.

Another object of the present invention is to provide a low friction type anti-fouling paint for making better a compatibility with a paint system of a ship, thereby reducing a surface tension and improving a surface fluidity, and reducing a total of internal and external surface tensions of the paint, and the reduced external surface tension is so much lower than a surface tension for adhering a marine life and a foreign material, thereby fundamentally preventing the adherence of a variety of lives and foreign materials and at the same time, providing remarkably excellent adherence, impact resistance, anti fouling property, speed friction resistance, and hull roughness, remarkably reducing a hull friction resistance, and giving a contribution to fuel economy.

A further object of the present invention is to provide a low friction type anti-fouling paint in which, by using polysiloxane fluid for increasing a wettability of the paint, a surface tension of each component within a liquid paint is minimized and a spreadability of the paint is made good, thereby adhesively coating the paint on a surface and increasing an adhesive force.

A further another object of the present invention is to provide a low friction type anti-fouling paint in which polyurea having excellent elongation and tensile strength is used, thereby providing excellent elongation, elasticity, friction resistance, anti-fouling property, durability, and adhesive force, and providing environment-friendliness not causing environment pollution and thus, when a ship comes alongside a pier, not only preventing a damage caused by a fender but also providing excellent impact resistance and abrasion resistance for enduring even an impact at the time of sailing, thereby allowing a rudder part of the ship to endure cavitation and preventing a corrosion.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a low friction type anti-fouling paint. The anti-fouling paint includes prepolymer fluid formed of 10% to 30% NCO mythylene diisocyanate of 100 wt %; and resin fluid formed of polyoxylpropylenediamine of about 42 wt % to 48 wt % for adjusting an elongation and a tensile strength of a paint film, polyethertriamine of about 8 wt % to 10 wt % having a molecular weight of 5,000 for adjusting a curing time, polydiphenyltriamine of about 15 wt % to 20 wt % for adjusting a curing physical property and increasing the elongation, a modified silicone fluid of about 8 wt % to 12 wt % for increasing a slip and an anti fouling property, a filler of about 5 wt % to 9 wt % for increasing an abrasion resistance, an adhesion promoter of about 1 wt % to 2 wt % for making a mixture of raw materials smooth and increasing an adhesive force with a surface, and a pigment of about 1 wt % to 2 wt % for expressing a color. The prepolymer fluid and the resin fluid are mixed and used on a point-to-point basis.

It is to be understood that both the foregoing summary and the following detailed description of the present invention are merely exemplary and intended for explanatory purposes only.

DETAILED DESCRIPTION OF THE INVENTION

Reference will now be made in detail to the preferred embodiments of the present invention, examples of which are illustrated in the accompanying drawings. Wherever possible, the same reference numerals will be used throughout the drawings to refer to the same or like parts.

A low friction type anti-fouling paint according to the present invention is composed of prepolymer fluid, which is a curing agent, for determining an elongation and a tensile strength of the anti-fouling paint, and resin fluid for reducing a surface tension and improving a surface fluidity, thereby preventing a foreign material from adhering to a surface and remarkably reducing a friction resistance against the surface.

The prepolymer fluid is formed of 10% to 30% NCO mythylene diisocyanate of 100 wt %. The methylene diisocyanate uses a bonding of N=C=O (Hereinafter, referred to as "NCO") as material having influence on a physical property such as total hardness, weather resistance, and elongation. As NCO contents increase, a hardness of a cured paint film increases. As the NCO contents decrease, the hardness of the cured paint film decreases. The inventive low friction type anti-fouling paint uses the 10% to 30% NCO methylene diisocyanate.

The resin fluid is prepared by inputting into a reaction chamber polyoxylpropylenediamine of about 42 wt % to 48 wt % for adjusting an elongation and a tensile strength of the paint film, polyethertriamine of about 8 wt % to 10 wt % having a molecular weight of 5,000 for adjusting a curing time, polydiphenyltriamine of about 15 wt % to 20 wt % for adjusting a gelling time, that is, a curing time among curing physical properties and increasing an elongation, a reactive amino-modified silicone fluid of about 8 wt % to 20 wt % for increasing slip and anti fouling property, an amino-modified fluorinated resin of about 0.5 wt % to 10 wt %, a filler of about 5 wt % to 9 wt % for increasing abrasion resistance, an adhesion promoter of about 1 wt % to 2 wt % for making a mixture of raw materials smooth and increasing an adhesive force with the surface at the time of coating, and a pigment of about 1 wt % to 2 wt % for expressing a color, and agitating and homogenizing the input resultant for about 20 to 30 minutes while maintaining a speed of about 200 to 300 rpm.

When the polyoxylpropylenediamine of the resin fluid for adjusting the elongation and the tensile strength of the paint film is added less than 42 wt %, the elongation of the paint film is reduced. When it exceeds by 48 wt % or more, the elongation and the tensile strength increase but the abrasion resistance is reduced and the durability is reduced. Thus, it is desirable to add the polyoxylpropylenediamine within a range of about 42 wt % to 48 wt %.

When the polyethertriamine of the curing fluid having the molecular weight of 5,000 for adjusting the curing time is added less than 8 wt %, the curing time is lengthened. When it is added by 10 wt % or more, the curing time is too fast, thereby deteriorating an appearance and a reducing the adhesive force. Thus, it is desirable to add the polyethertriamine within a range of about 8 wt % to 10 wt %.

When the polydiphenyltriamine of the curing fluid for adjusting the curing time among the curing physical properties and increasing the elongation is added less than 15 wt %, there is a drawback in that, in view of a characteristic of the polyurea fluid, surface glueyness remains, and it remains even after completion of the curing, thereby causing a surface pollution and the adherence of the foreign material, and reducing the abrasion resistance. When it exceeds by 20 wt % or more, the curing time is fast whereas the durability after the curing is reduced, thereby causing easy cutting or fragility. Thus, it is desirable to add the polydiphenyltriamine within a range of about 15 wt % to 20 wt %.

When the reactive amino-modified silicone fluid of the resin fluid for increasing the slip and the anti fouling property is added less than 8 wt %, the slip and the anti fouling property are reduced, thereby making it difficult to fundamentally prevent the adherence of the foreign material. When it is excessively added by 20 wt % or more, an interlayer adhesiveness is reduced and the elongation is also reduced. Thus, it is desirable to add the reactive amino-modified silicone fluid within a range of about 8 wt % to 20 wt %.

When the amino-modified fluorinated resin is added less than 0.5 wt %, the slip and the anti fouling property are reduced, thereby making it difficult to fundamentally prevent the adherence of the foreign material. When it is excessively added by 10 wt % or more, the interlayer adhesiveness is reduced and the elongation is also reduced. Thus, it is desirable to add the amino-modified fluorinated resin within a range of about 0.5 wt % to 10 wt %.

The filler of the resin fluid for increasing the abrasion resistance uses nano silicate. When the filler is added less than 5 wt %, the abrasion resistance is reduced. When it is added by 9 wt % or more, a specific gravity increases, thereby affecting a reaction. Thus, it is desirable to add the filler within a range of about 5 wt % to 9 wt %.

The adhesion promoter of the resin fluid for making the mixture of the raw materials smooth and increasing the adhesive force with the surface at the time of coating uses any one selected from the group of beta-(3,4-epoxycyclohexyl)ethyltrimethoysilane, gamma-glycidoxypropyltrimethoxysilane, and gamma-methacryloxypropyltrimethoxysilane, which are silane coupling agents having both inorganic and organic properties. When the silane coupling agent is added less than 1 wt %, the adhesive force is reduced. When it is added by 2 wt % or more, the adhesive force is increased but the abrasion resistance is reduced. Thus, it is desirable to add the silane coupling agent within a range of about 1 wt % to 2 wt %.

The pigment of the resin fluid for expressing the color is added in various colors depending on a color condition but when it is added less than 1 wt %, the color is hidden and disappeared. In general, when it is added within a range of about 1 wt % to 2 wt %, a desired color is obtained.

A process of forming an anti-fouling layer on the surface using the above low friction type anti-fouling paint according to the present invention will be described below.

First, the surfaces of a part of a ship hull under waterline, and an inner surface of fluid and gas transfer pipe, a steel pipe for water service, or a concrete water tank are pretreated by a power tool, thereby removing the foreign material. Primer is coated, and a pretreatment process is performed for increasing the adhesive force between the surface and a composition according to the present invention.

Upon completion of the pretreatment process, a spray process is performed to spray the prepolymer fluid for determining the elongation and the tensile strength of the paint, and the resin fluid for reducing the surface tension and improving the surface fluidity, thereby fundamentally preventing the adherence of the foreign material such as a marine life and remarkably reducing the friction resistance against the fluid on the pretreated surface, on a point-to-point basis, under a pressure of about 2,000 psi or more at a hose temperature of about 70° C. to 80° C., using the two-liquid type high pressure spray equipment.

If the prepolymer fluid and the resin fluid are sprayed on the surface on a point-to-point basis in the spray process, they are mixed and chemically reacted with each other, and are cured in one to two minutes in an anti-fouling layer forming process, thereby forming an anti-fouling layer on the surface. The anti-fouling layer is very smooth on its surface due to the modified silicone fluid, thereby fundamentally preventing the adherence of the foreign material such as the marine life and specifically, in the case of the ship, remarkably reducing the friction resistance of the hull.

When the anti-fouling layer is formed using the two-liquid high pressure spray equipment in the spray process, if the anti-fouling layer is embossed in a concavo-convex shape on its surface, a surface area of the marine life contacting with the anti-fouling layer is remarkably less, thereby more enhancing an anti-fouling effect and at the same time, reducing the friction resistance.

Embodiments of the present invention will be described below.

Composition content percentages according to first to fifth embodiments of the present invention are shown in Table 1.

First, in the first to third embodiments, in a fixed state of constituent components of resin fluid, which are polyoxylpropylenediamine of about 43 wt %, polyethertriamine of about 9 wt % having the molecular weight of 5,000, a modified silicone fluid of about 15 wt %, a modified fluorinated resin of about 5 wt %, polydiphenyltriamine of about 17 wt %, a pigment of about 2 wt %, a filler of about 8 wt %, and an adhesion promoter of about 1 wt %, the NCO contents of the prepolymer fluid were varied with 10%, 11.4%, and 13% while a specimen was prepared. The adhesiveness, the impact resistance, the anti-fouling property, the speed friction resistance, and the hull roughness were measured using the specimen and are shown in the Table 2.

In the fourth and fifth embodiments, in a fixed state of constituent components of resin fluid, which are polyoxylpropylenediamine of about 42 wt % and 48 wt %, polyethertriamine of about 8 wt % and 10 wt % having the molecular weight of 5,000, a pigment of about 2 wt %, a filler of about 8 wt %, and an adhesion promoter of about 1 wt %, a modified silicone fluid of about 8 wt % and 17 wt %, a modified fluorinated resin of about 2 wt % and 7 wt %, and polydiphenyltriamine of about 20 wt % and 16 wt % were varied by a mixture percentage and at the same time, the NCO contents of prepolymer fluid were varied with 11.4% and 13% while a specimen was prepared. The adhesiveness, the impact resistance, the anti fouling property, the speed friction resistance, and the hull roughness were measured using the specimen and are shown in the Table 2.

TABLE 1

Component mixture percentages of 1st to 5th embodiments

| Polyurea | Component | Mixture percentage (wt %) | | | | | | |
| --- | --- | --- | --- | --- | --- | --- | --- | --- |
| | | 1st | 2nd | 3rd | 4th | 5th | Compar. Example 1 | Compar. Example 2 |
| Prepolymer fluid | NCO methylenediisocyanate | 100 | 100 | 100 | 100 | 100 | Conventional anti-fouling paint (spc paint) | Imported silicone paint |
| | NCO % (10% to 13%) | 10% | 11.4% | 13% | 11.4% | 13% | | |
| Resin fluid | polyoxylpropylenediamine (42 wt % to 48 wt %) | 43 | 43 | 43 | 48 | 42 | | |
| | polyethertriamine of molecular weight of 5,000 (8 wt % to 10 wt %) | 9 | 9 | 9 | 10 | 8 | | |
| | modified silicone fluid (8 wt % to 20 wt %) | 15 | 15 | 15 | 8 | 17 | | |
| | modified fluorinated resin (0.5 wt % to 10 wt %) | 5 | 5 | 5 | 3 | 7 | | |
| | polydiphenyltriamine (15 wt % to 20 wt %) | 17 | 17 | 17 | 20 | 15 | | |
| | pigment (1 wt % to 2 wt %) | 2 | 2 | 2 | 2 | 2 | | |
| | filler (5 wt % to 9 wt %) | 8 | 8 | 8 | 8 | 8 | | |
| | adhesion promoter (1 wt % to 2 wt %) | 1 | 1 | 1 | 1 | 1 | | |

The inventive low friction type anti-fouling paints prepared in the first to fifth embodiments were coated at a thickness of 500 μm to 800 μm, on the same steel plate as the ship hull having horizontal and vertical widths of 20 cm and 30 cm and a thickness of 3 mm, and were tested in an elcometer adhesion dolly test and was measured in adhesiveness and at the same time, were measured in impact resistance using a Dupont type impact tester.

The inventive low friction type anti-fouling paints prepared in the first to fifth embodiments were coated at a thickness of 500 μm to 800 μm, on the same steel plate as the ship hull having horizontal and vertical widths of 50 cm and 60 cm and a thickness of 3 mm, and a specimen was dipped in the inshore having a water depth of 4 m to 5 m and then, the anti fouling property was measured during twelve months as to whether or not the marine life and the foreign material adhere.

The inventive low friction type anti-fouling paints prepared in the first to fifth embodiments were coated at a thickness of 500 μm to 800 μm, on the same model ship as the ship hull having horizontal and vertical widths of 100 cm and 200 cm and a thickness of 3 mm, and were inputted in a speed circulating water channel tester and measured in speed friction resistance.

The inventive low friction type anti-fouling paints prepared in the first to fifth embodiments were coated at a thickness of 500 μm to 800 μm, on the same steel plate as the ship hull having horizontal and vertical widths of 100 cm and 100 cm and a thickness of 3 mm, and were measured in hull roughness using a hull roughness meter.

and providing the excellent adhesive force by appropriate amino-modified silicone resin fluid and adhesion promoter.

As in the first to fifth embodiments, it can be appreciated that the low friction type anti-fouling paint has the excellent elasticity and elongation and thus, is excellent in impact resistance. In the first, second, third, and fifth embodiments, it can be confirmed that the low friction type anti-fouling paint almost prevents the adherence of the marine life by appropriate amino-modified silicone fluid and modified fluorinated resin, and some adhering marine lives are easily removed. It was shown that even a variety of foreign materials are never adhered.

In the speed friction resistance, it was shown that the less a numeric level of the hull roughness is, the less a resistance of the model ship is. The result was obtained that the hull roughness has the excellent slip when amino-modified silicone resin fluid contents are 15% and modified fluorinated resin fluid contents are 5%.

As such, the inventive low friction type anti-fouling paint uses a mixture of silicone and fluorinated resin and thus, has a good compatibility with other paint, and reduces the surface tension and improves the surface fluidity, thereby fundamentally preventing the adherence of the marine life and the foreign material, and does not contain an anti-fouling agent causing the environmental pollution and thus, is environment-friendly, thereby effectively preserving marine environment and actively coping with international environment regulation and in addition, is very smooth on its surface and

TABLE 2

Measurement result table of adhesiveness, impact resistance, anti fouling property, speed friction resistance, and hull roughness in first to fifth embodiments and first and second comparative examples:

| Measurement item | 1st | 2nd | 3rd | 4th | 5th | Compar. example 1 | Compar. example 2 |
|---|---|---|---|---|---|---|---|
| Adhesiveness (N/m²) | 10 | 11 | 10 | 8 | 7 | 6 | 6 |
| Impact resistance (1 kg, 50 cm) | Good | good | good | good | good | bad | bad |
| Anti-fouling property (12 months) | Nonadhere | nonadhere | nonadhere | Adhere less than 2% | nonadhere | Adhere less than 2% | Adhere by 5% or less |
| Speed friction resistance (N/2(m/s)) | 30 | 30 | 30 | 40 | 27 | 40 | 60 |
| Hull roughness | 10 | 10 | 10 | 21 | 8 | 30 | 80 |

As appreciated in the first to fifth embodiments, the inventive low friction type anti-fouling paint was measured remarkably excellent in adhesiveness, impact resistance, anti fouling property, speed friction resistance, and hull roughness in comparison to the first and second comparative examples that are the conventional anti-fouling paint (spc paint) and the imported silicone paint. As in the first to third embodiments, it was measured that there was almost no difference within a range of 10% to 30% NCO of methylenediisocyanate that is the prepolymer fluid.

As in the fourth and fifth embodiments in particular, it can be appreciated that the more an addition amount of the modified silicone fluid is, the better the impact resistance, the anti-fouling property, the speed friction resistance, and the hull roughness are, but the adhesiveness is deteriorated.

As in the first to fifth embodiments, it was that the low friction type anti-fouling paint improves the wettability and the spreadability of the paint and allows adherence and coating on the steel plate, thereby increasing the adhesive force thus, reduces the hull friction resistance. It can be expected to reduce the amount of fuel consumption when the ship sails.

As described above, the present invention has an effect that it provides the low friction type anti-fouling paint in which the prepolymer fluid formed of main material of 10% to 13% NCO (N=C=O bonding) methylene diisocyanate, and the resin fluid formed of polyoxylpropylenediamine, polyethertriamine having the molecular weight of 5,000, polydiphenyltriamine, modified silicone fluid, modified fluorinated resin, filler, adhesion promoter, and pigment are prepared respectively, and the respective prepolymer fluid and resin fluid are sprayed by the two-liquid spray equipment, thereby forming a high-speed curing polyurea and thus, makes better a compatibility with a paint system of the ship, thereby reducing the surface tension and improving the surface fluidity, and causes the reduction of a total of the internal and external surface tensions of the paint, and the reduced external surface tension is so much lower than the surface tension for adhering the marine life and the foreign material, thereby fundamentally preventing the adherence of a variety of lives and foreign materials and at the same time, providing remarkably excellent adherence, impact resistance, anti fouling property, speed friction resistance, and hull roughness, remarkably reducing the hull friction resistance, and giving a contribution to the fuel economy.

Further, the present invention has an effect in that it provides the low friction type anti-fouling paint in which the surface tension of each component within a liquid paint is minimized and the spreadability of the paint is made good, thereby adhesively coating the paint on the surface and increasing the adhesive force, and polyurea having the excellent elongation and tensile strength is used, thereby providing the excellent elongation, elasticity, friction resistance, anti fouling property, durability, and adhesive force, and providing environment-friendliness not causing environment pollution and thus, when the ship comes alongside the pier, not only preventing the damage caused by the fender but also providing the excellent impact resistance and abrasion resistance for enduring even the impact at the time of sailing, thereby preventing a corrosion of the ship and at the same time, preventing the environmental pollution owing to environmental-friendliness.

Furthermore, the present invention has an effect that when it is applied to inner surfaces of the fluid and gas transfer pipe and the steel pipe for water service, the adherence of the foreign material is prevented, thereby allowing a smooth flow of the fluid and extending a lifetime of the pipe.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A low friction type anti-fouling paint, comprising:
   prepolymer fluid comprising 10% to 30% NCO methylene diisocyanate by weight; and
   resin fluid formed of polyoxylpropylenediamine of about 42 wt % to 48 wt % of the total weight of the resin fluid for adjusting an elongation and a tensile strength of a paint film, polyethertriamine of about 8 wt % to 10 wt % of the total weight of the resin fluid, said polyethertriamine having a molecular weight of 5,000 for adjusting a curing time, polydiphenyltriamine of about 15 wt % to 20 wt % of the total weight of the resin fluid for adjusting a curing physical property and increasing the elongation, a modified silicone fluid of about 8 wt % to 12 wt % of the total weight of the resin fluid for increasing a slip and an anti fouling property, a filler of about 5 wt % to 9 wt % of the total weight of the resin fluid for increasing an abrasion resistance, an adhesion promoter of about 1 wt % to 2 wt % of the total weight of the resin fluid for making a mixture of raw materials smooth and increasing an adhesive force with a surface, and a pigment of about 1 wt % to 2 wt % of the total weight of the resin fluid for expressing a color,
   wherein the prepolymer fluid and the resin fluid are mixed and used at a ratio of 1:1.

\* \* \* \* \*